US009482536B2

(12) United States Patent
Mian et al.

(10) Patent No.: US 9,482,536 B2
(45) Date of Patent: Nov. 1, 2016

(54) POSE ESTIMATION

(71) Applicant: International Electronic Machines Corporation, Troy, NY (US)

(72) Inventors: Zahid F. Mian, Loudonville, NY (US); William G. vonAchen, Latham, NY (US)

(73) Assignees: International Electronic Machines Corp., Troy, NY (US); CSX Transportation, Inc., Jacksonville, FL (US)

( * ) Notice: Subject to any disclaimer, the term of this patent is extended or adjusted under 35 U.S.C. 154(b) by 0 days.

(21) Appl. No.: 13/756,255

(22) Filed: Jan. 31, 2013

(65) Prior Publication Data
US 2013/0325334 A1  Dec. 5, 2013

Related U.S. Application Data

(60) Provisional application No. 61/689,172, filed on May 31, 2012.

(51) Int. Cl.
*G01C 21/00* (2006.01)
*G01C 21/16* (2006.01)
*G05D 1/02* (2006.01)

(52) U.S. Cl.
CPC ............ *G01C 21/00* (2013.01); *G01C 21/165* (2013.01); *G05D 1/027* (2013.01); *G05D 1/0278* (2013.01); *G05D 2201/0207* (2013.01)

(58) Field of Classification Search
CPC .... G01C 21/00; G01C 21/165; G05D 1/027; G05D 1/0278; G05D 2201/0207
USPC ....... 700/245, 250, 253, 254, 258, 259, 262, 700/263
See application file for complete search history.

(56) References Cited

U.S. PATENT DOCUMENTS

| 5,343,209 | A | 8/1994 | Sennott et al. |
| 6,092,033 | A * | 7/2000 | Uhlmann ................ G06F 17/18 701/469 |
| 6,240,367 | B1 * | 5/2001 | Lin ........................ G01C 21/28 342/357.31 |
| 6,757,668 | B1 * | 6/2004 | Goebel ................ G06K 9/6292 706/47 |
| 6,816,804 | B1 * | 11/2004 | Lee ........................ B60T 8/172 701/45 |
| 6,829,568 | B2 * | 12/2004 | Julier ..................... G06F 17/18 702/189 |
| 2002/0008661 | A1 | 1/2002 | McCall et al. |
| 2005/0234679 | A1 * | 10/2005 | Karlsson ............. G05D 1/0272 702/181 |

(Continued)

FOREIGN PATENT DOCUMENTS

EP    2026037 A2    2/2009

OTHER PUBLICATIONS iRobot 510 Packbot, Copyright 2011-2012, 5 pages.

(Continued)

*Primary Examiner* — Stephen Holwerda
(74) *Attorney, Agent, or Firm* — LaBatt, LLC

(57) ABSTRACT

A solution for estimating the pose of a platform, such as a vehicle, is provided. Data from a plurality of types of sensing devices located on the platform can be used to independently calculate a plurality of preliminary estimates corresponding to the pose. A plurality of estimates corresponding to the pose can be generated using the preliminary estimates and at least one covariance matrix. One or more entries in the covariance matrix are adjusted based on an uncertainty for the corresponding preliminary estimate. The uncertainty can vary based on time, distance, and/or velocity of the platform.

20 Claims, 5 Drawing Sheets

(56) References Cited

U.S. PATENT DOCUMENTS

| | | | | |
|---|---|---|---|---|
| 2006/0224357 A1* | 10/2006 | Taware | ............... | G07C 5/085 |
| | | | | 702/179 |
| 2007/0244600 A1* | 10/2007 | Myeong | ............... | G05D 1/027 |
| | | | | 700/245 |
| 2010/0256906 A1 | 10/2010 | Monrocq et al. | | |
| 2011/0202204 A1 | 8/2011 | Kahn | | |

OTHER PUBLICATIONS

Talon The Warfighter's Choice, QinetiQ, 2 pages.

Kim, Search Report for PCT Application No. US2013042957, Apr. 21, 2014, 10 pages.

Ayala Perriello, M., International Application No. EP 13 83 7760, Supplemental Search Report, May 24, 2016, 6 pages.

\* cited by examiner

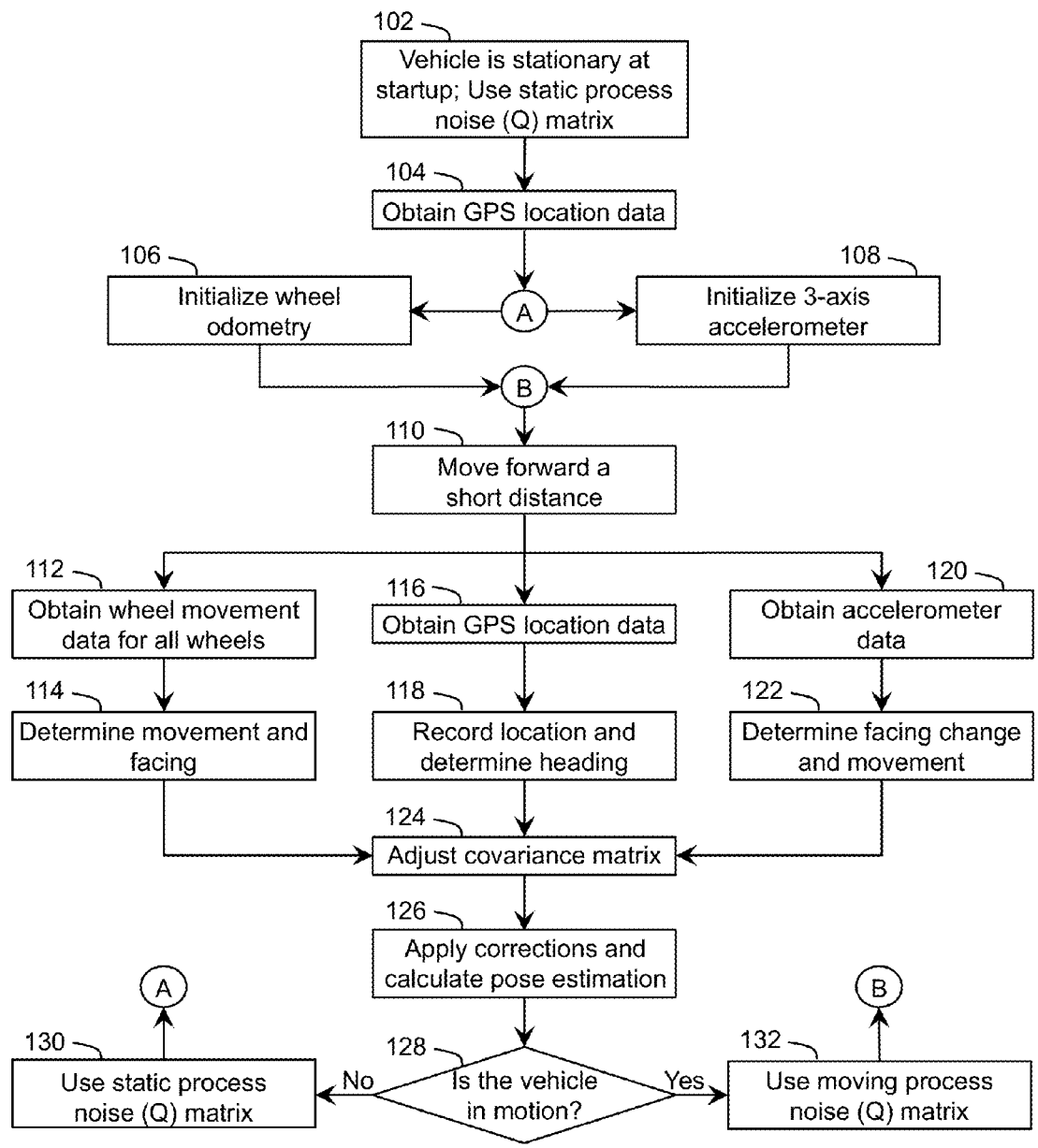

POSE ESTIMATION

REFERENCE TO RELATED APPLICATIONS

The current application claims the benefit of U.S. Provisional Application No. 61/689,172, titled "Pose estimation method for unmanned systems," which was filed on 31 May 2012, and which is hereby incorporated by reference.

TECHNICAL FIELD

The disclosure relates generally to pose estimation, and more particularly, to a solution for accurately determining a pose of an unmanned system.

BACKGROUND ART

"Pose" is a term commonly used in unmanned vehicle navigation to reference a directional heading of the vehicle. Additionally, depending on context, the pose of the vehicle also can include its motion (e.g., velocity) and distance of travel. To this extent, a "pose estimator" refers to a system or method for determining how far an unmanned vehicle has traveled, the direction of travel, and the current directional heading of the vehicle.

Unmanned system navigation initially used a single method, such as wheel odometry, inertial tracking, optical flow, and/or the like. However, each individual method is subject to a certain degree of uncertainty. For example, the wheels of a vehicle can slip, causing them to register distance or turning when the vehicle has actually failed to move. A global positioning system (GPS) unit has randomly-varying uncertainty, which causes the determined location to fluctuate within a bounded area, the shape of which varies with location on the planetary surface. An inertial tracking system also is subject to noise, which can result in an illusion of movement when there is no movement or shift the detected motion in some unknown direction.

Previous approaches to reducing the uncertainty in each of these methods have been utilized. For example, Kalman filtering can be applied to successive readings. While such approaches can reduce the uncertainty to some extent, none of the approaches is able to produce sufficiently accurate results for numerous applications of unmanned vehicles. In particular, the GPS system tends to be extremely poor at providing heading/facing information and the inertial system and wheel odometry approaches tend to result in cumulative errors over time.

Current approaches frequently combine, or fuse, the results of two or more pose information acquisition methods to provide a more reliable overall pose estimation for an unmanned vehicle. For example, a current approach includes adding a simple refinement, such as adding a compass to provide a more objective baseline for facing information. Another approach includes fusing multiple pose estimation methods, each of which individually provides its own full pose estimate. To date, these approaches assume that, as each data acquisition method is generally independent, the source(s) of the corresponding noise or uncertainty in each data acquisition method are independently random. As a result, current approaches assume that combining the results of multiple data acquisition approaches will allow the combination to significantly reduce the overall uncertainty in the resulting pose estimation.

SUMMARY OF THE INVENTION

Aspects of the invention provide a solution for estimating the pose of a platform, such as a vehicle. Data from a plurality of types of sensing devices located on the platform can be used to independently calculate a plurality of preliminary estimates corresponding to the pose. A plurality of estimates corresponding to the pose can be generated using the preliminary estimates and at least one covariance matrix. One or more entries in the covariance matrix are adjusted based on an uncertainty for the corresponding preliminary estimate. The uncertainty can vary based on time, distance, and/or velocity of the platform.

A first aspect of the invention provides a method comprising: a computer system periodically calculating a plurality of estimates corresponding to a pose of a platform, wherein the periodically calculating includes: for each of a plurality of types of sensor data, independently calculating at least one of a plurality of preliminary estimates based on the sensor data corresponding to the type of sensor data; and generating the plurality of estimates using the plurality of preliminary estimates and at least one covariance matrix, wherein the at least one covariance matrix is adjusted based an uncertainty for at least one of the preliminary estimates that varies based on at least one of: time, distance, or velocity of the platform.

A second aspect of the invention provides a computer system comprising: a set of computing devices configured to perform a method comprising periodically calculating a plurality of estimates corresponding to a pose of a platform, wherein the periodically calculating includes: for each of a plurality of types of sensor data, independently calculating at least one of a plurality of preliminary estimates based on the sensor data corresponding to the type of sensor data; and generating the plurality of estimates using the plurality of preliminary estimates and at least one covariance matrix, wherein the at least one covariance matrix is adjusted based an uncertainty for at least one of the preliminary estimates that varies based on at least one of: time, distance, or velocity of the platform.

A third aspect of the invention provides a vehicle comprising: a navigation system including a set of computing devices configured to perform a method comprising: periodically calculating a plurality of estimates corresponding to a pose of the vehicle, wherein the periodically calculating includes: for each of a plurality of types of sensor data, independently calculating at least one of a plurality of preliminary estimates based on the sensor data corresponding to the type of sensor data; and generating the plurality of estimates using the plurality of preliminary estimates and at least one covariance matrix, wherein the at least one covariance matrix is adjusted based an uncertainty for at least one of the preliminary estimates that varies based on at least one of: time, distance, or velocity of the vehicle; and managing navigation of the vehicle using the plurality of estimates corresponding to the pose.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 4 shows an illustrative process for managing movement of a vehicle according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
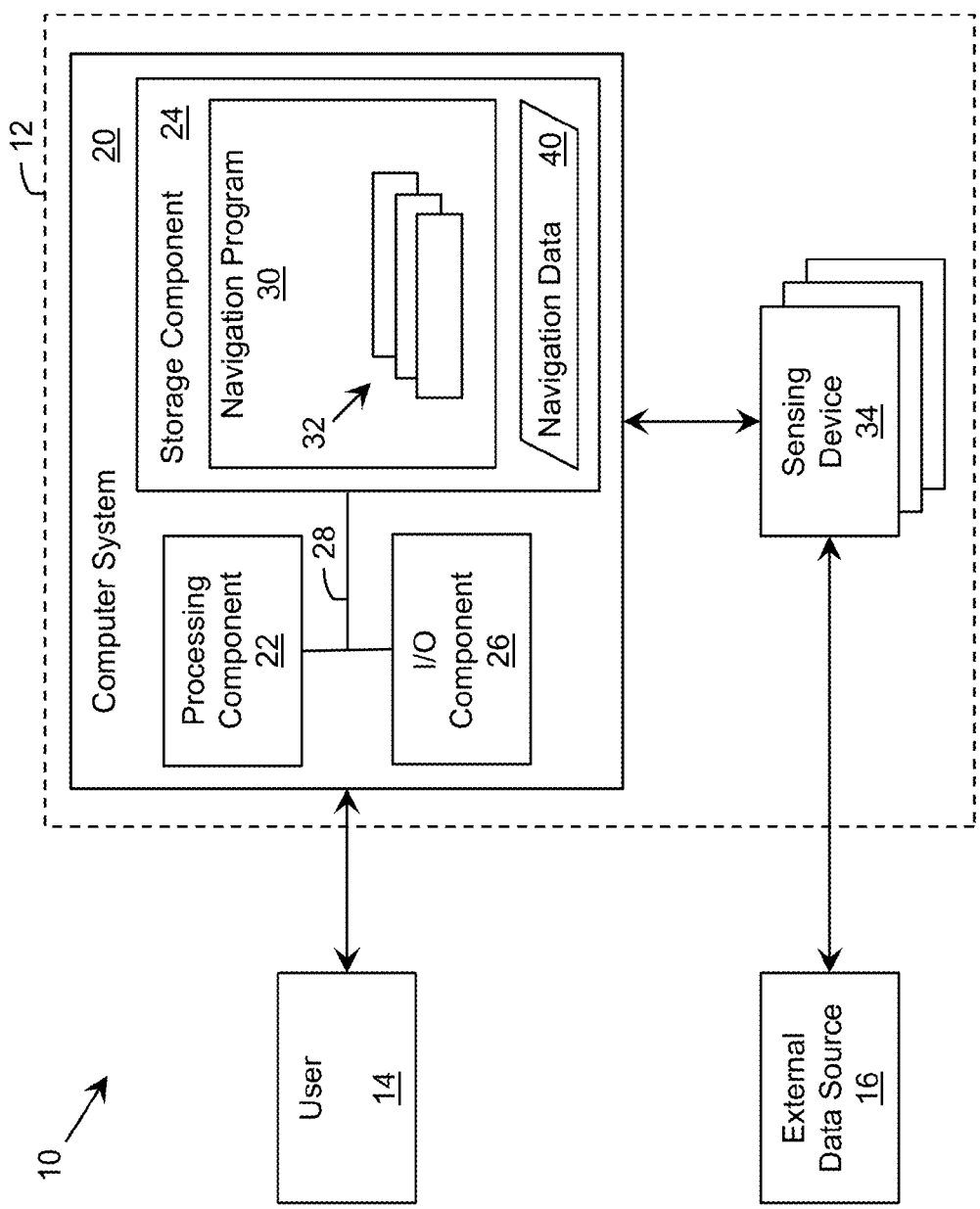
FIG. 1 shows an illustrative environment for managing movement of a vehicle according to an embodiment.

The inventors recognize one or more problems present in each of the prior art fusion-based pose estimation approaches. In particular, current pose estimation approaches neglect multiple factors, which can lead to highly unreliable onboard determinations of the system location and heading, which in turn can lead to many undesirable consequences. For example, prior approaches use a fixed method to determine the noise and/or uncertainty present in each pose estimation and/or data acquisition technique. However, the inventors have found that in practice, the uncertainty in each technique can vary drastically with operating conditions (e.g., whether the vehicle is in motion or not) depending on the technique. Furthermore, the variation is not always linear. For example, an accelerometer-based inertial system can be configured to provide a zero reading when the unmanned vehicle is not moving, thereby providing a highly accurate measurement with no uncertainty. The accuracy of a GPS system can vary depending on whether the onboard system can "see" any satellites. For example, in a wide open field, the GPS-based measurement is likely to be quite accurate, whereas in an area where some or all of the satellite signals are screened out, such as under a large bridge or inside a building, the GPS-based measurement may be inaccurate or unavailable.

The inventors also recognize that individual data acquisition techniques available for use in pose estimation can have strong and weak points in their operation. For example, solely GPS-based measurement data provides no inherent heading/facing information since the data is purely positional. As a result, in order to determine facing information it may be necessary to derive it from two or more successive readings while the unmanned vehicle is in motion. However, due to jitter in individual GPS-based readings, GPS-based facing estimates can still vary greatly.

Inertial data acquisition systems (e.g., three-axis accelerometers, gyroscopes, magnetometers, and/or the like) can provide information on the relative change of acceleration and, given a default starting heading, can provide reasonable estimates of facing and movement. However, these systems cannot inherently determine the location of the unmanned vehicle. Even when provided with starting heading and location data, the heading and location information provided by an inertial data acquisition system often become less accurate over time in a generally linear manner due to accumulation of inherent noise factors in the measurement data. Similarly, since wheel slippage is difficult to detect, and even if detected, can only be quantified to a certain limit, wheel odometry based-data also tends to be increasingly less accurate in a linear fashion over time. The precise values for the departures of each measurement technique can vary depending on various situations. For example, wheel slippage can be more frequent when the wheels are traveling on sand or ice as opposed to dry pavement or solid earth. Additionally, magnetometer-based measurement data can be less accurate when the unmanned vehicle is operating in the proximity of significant amounts of ferrous metals (e.g., in a large rail yard, where the rails and many of the cars are composed of steel).

Additionally, the inventors recognize that since current fusion-based pose estimation approaches do not account for the various shifts in behavior of the different measurement techniques, these current pose estimation approaches will consistently overestimate or underestimate corrections to the data of each individual technique or the weighting to be assigned to each individual technique. As a result, inaccuracy in the positional and directional estimates provided by current pose estimation approaches is increased over the results capable of being obtained using a fusion-based pose estimation approach.

In light of the above, aspects of the invention can overcome one or more of the limitations of current fusion-based pose estimation approaches described herein. An embodiment of the invention can be directed to estimating the pose (e.g., course and heading) of an unmanned system, which can be traveling on ground, water, air, and/or the like. To this extent, aspects of the invention provide a solution for estimating the pose of a platform, such as a vehicle. Data from a plurality of types of sensing devices located on the platform can be used to independently calculate a plurality of preliminary estimates corresponding to the pose. A plurality of estimates corresponding to the pose can be generated using the preliminary estimates and at least one covariance matrix. One or more entries in the covariance matrix are adjusted based on an uncertainty for the corresponding preliminary estimate. The uncertainty can vary based on time, distance, and/or velocity of the platform. As used herein, unless otherwise noted, the term "set" means one or more (i.e., at least one) and the phrase "any solution" means any now known or later developed solution.

Turning to the drawings, FIG. 1 shows an illustrative environment 10 for managing movement of a vehicle 12 according to an embodiment. To this extent, the environment 10 includes a computer system 20 that can perform a process described herein in order to manage movement of the vehicle 12. In particular, the computer system 20 is shown including a navigation program 30, which makes the computer system 20 operable to manage movement of the vehicle 12 by performing a process described herein. While the computer system 20 is shown as being physically located on the vehicle 12, it is understood that the computer system 20, or portions thereof, can be located physically apart from the vehicle 12. In this case, the vehicle 12 can include one or more computing devices capable of communicating with the computer system 20, e.g., using a wireless solution.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the navigation program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the navigation program 30 can manage a set of interfaces (e.g., graphical user interface(s), application program interface, and/or the like) that enable human and/or system users 12 to interact with the navigation program 30. Furthermore, the navigation program 30 can manage (e.g., store, retrieve, create, manipulate, organize, present, etc.) the data, such as navigation data 40, using any solution.

In any event, the computer system 20 can comprise one or more general purpose computing articles of manufacture (e.g., computing devices) capable of executing program code, such as the navigation program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the navigation program 30 can be embodied as any combination of system software and/or application software.

Furthermore, the navigation program 30 can be implemented using a set of modules 32. In this case, a module 32 can enable the computer system 20 to perform a set of tasks used by the navigation program 30, and can be separately developed and/or implemented apart from other portions of the navigation program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the navigation program 30 fixed thereon (e.g., one or more modules 32). However, it is understood that the computer system 20 and the navigation program 30 are only representative of various possible equivalent computer systems that may perform a process described herein. To this extent, in other embodiments, the functionality provided by the computer system 20 and the navigation program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the navigation program 30 enables the computer system 20 to manage movement of the vehicle 12. In an embodiment, the vehicle 12 is an unmanned vehicle, and the computer system 20 is configured to navigate the vehicle 12 in a fully automated manner. Alternatively, the vehicle 12 can be configured to be operated by a user 14 and include a computer system 20 capable of moving the vehicle 12 in a semi or fully automated manner for certain periods of time. Additionally, the vehicle 12 can be configured to be manually navigated by a user 14. Regardless, in each case the computer system 20 can be configured to provide information to a user 14 regarding the movement of the vehicle 12. The user 14 can be located on the vehicle 12, operating (e.g., teleoperating) the vehicle 12 from a remote location, monitoring the vehicle 12 from a remote location, and/or the like.

The vehicle 12 can be any size and/or type of vehicle 12. For example, the vehicle 12 can be a small device, such as a tread-driven unmanned ground vehicle (e.g., iRobot®, Packbot®, Talon® manufactured by QinetiQ, and/or the like). Alternatively, the vehicle 12 can be a larger vehicle, such as an automated truck navigating in a convoy. Still further, the vehicle 12 can be a waterborne vehicle, an aerial vehicle (e.g., such as a Predator combat drone), an amphibious vehicle, a rail vehicle, and/or the like. While aspects of the invention are directed to managing the movement of a vehicle 12, it is understood that aspects of the invention can be directed to any type of platform, not just vehicles. For example, an embodiment of the computer system 20 can monitor the movement of a platform due to one or more external forces acting on the platform including, for example, wind, current, an external vehicle, and/or the like. To this extent, the platform can comprise a platform configured to monitor one or more aspects of the environment while moving freely in the environment.

Regardless, as part of managing the movement of the vehicle 12, the computer system 20 can determine and periodically update a pose of the vehicle 12 and store navigation data 40 corresponding to the pose of the vehicle 12 over a period of time. As used herein, the pose of a vehicle 12 includes data corresponding to a position (e.g., location) and a heading (e.g., orientation) of the vehicle 12. Navigation data 40 regarding the pose of the vehicle 12 over a period of time can enable the computer system 20 to determine and/or predict a course traveled/to be traveled by the vehicle 12.

The computer system 20 can determine the pose of the vehicle 12 using data obtained from a set of sensing devices 34. Each sensing device 34 can be configured to obtain (e.g., generate, acquire, and/or the like) data regarding one or more aspects of the position and/or heading of the vehicle 12. A sensing device 34 can automatically obtain the data in a periodic manner, obtain the data in response to a request, e.g., from the computer system 20, and/or the like. The sensing device 34 can include one or more sensors for generating data based on one or more attributes of the vehicle 12 and/or its surroundings. Additionally, the sensing device 34 can be configured to acquire data from an external data source 16. Regardless, each sensing device 34 can provide the data for processing by the computer system 20, which can store the data as navigation data 40.

In an embodiment, the vehicle 12 includes a plurality of types of sensing devices 34, each of which obtains a unique type of data corresponding to the pose of the vehicle 12. Illustrative types of data include a speed, a direction of travel, a distance traveled, a location (e.g., relative or absolute), and/or the like, of the vehicle 12. Illustrative sensing devices 34 can include a wheel encoder, a global positioning system (GPS) device, a set of inertial sensors including motion sensors (e.g., a three-axis accelerometer) and/or rotation sensors (e.g., a gyroscope), a magnetometer, and/or the like. However, it is understood that the types of sensing devices 34 and types of data are only illustrative, and the vehicle 12 can include any combination of various types of sensing devices 34, which are configured to obtain any combination of various types of data corresponding to the pose of the vehicle 12.

As described herein, aspects of the invention provide a solution for determining the pose of a vehicle 12 based on pose-related data obtained from a plurality of types of sensing devices 34. For example, an embodiment can create a physical model of the vehicle 12, which characterizes various aspects of the vehicle 12, such as its mass, performance characteristics, and/or the like, which can be related to the movement of the vehicle 12 in a target environment. An embodiment also can create a measurement model, which can include a plurality of navigation parameters obtained by the sensing devices 34, a set of Jacobian matrices for use with the navigation parameters (e.g., in Kalman-based filter processing), and covariances for each navigation parameter (e.g., time and/or situational dependent). Using the physical and measurement models, an embodiment can construct and implement a navigation process, which can include applying a process noise covariance and/or data-specific covariance matrices to adjust the emphasis (reliance) placed on a pose-related estimate derived from a particular type of navigation data.

In light of the above, aspects of the invention allow for adjusting the manner in which a pose estimate is calculated based on one or more conditions and/or circumstances present during the operation of the vehicle 12. These conditions and/or circumstances can affect an uncertainty in the data provided by one or more of the sensing devices 34. By accounting for the changed uncertainty, an uncertainty of an overall pose estimation can be reduced. For example, an embodiment can include one or more of: varying a process noise covariance matrix based on a velocity of the vehicle 12; calculating a heading using successive GPS location-based positions derived after filtering, where a large covariance is used when the vehicle 12 is stationary; adjusting a covariance for wheel odometry data from small to large (e.g., in a linear fashion) over time to account for accumulated errors; reinitializing one or more filters, sensing devices, and/or covariances when the vehicle is stationary; and/or the like. An embodiment of the invention can provide a calculated pose estimation for a vehicle 12, which is accurate to within a very small percentage of the "ground truth" pose for the vehicle 12 (e.g., as derived by an outside observer examining the location and heading of the vehicle).

Figure 2:
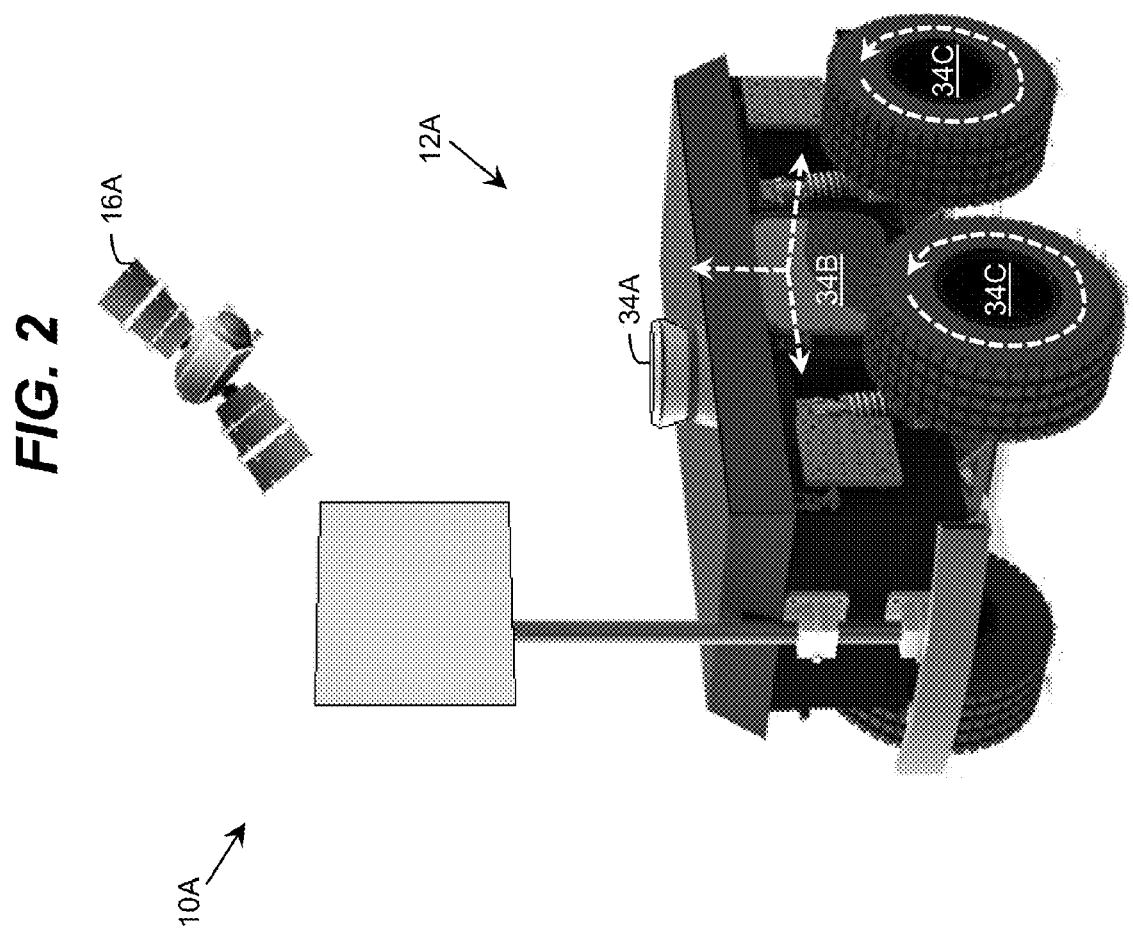
FIG. 2 shows another illustrative environment according to an embodiment.

FIG. 2 shows another illustrative environment 10A according to an embodiment. In this case, the vehicle 12A can comprise an unmanned ground-based vehicle with four wheels. In an embodiment, the vehicle 12A is navigated using a skid-steer drive. The vehicle 12A can include a set of sensing devices for acquiring data corresponding a pose of the vehicle 12A. The sensing devices can include, for example: an onboard GPS device 34A, which is configured to acquire location coordinates from any of various GPS satellites 16A; a 3-axis inertial measurement unit (IMU) 34B, which is configured to acquire vibration/acceleration data in the vertical, parallel horizontal, and perpendicular horizontal directions; a set of wheel encoders 34C, each of which is configured to provide data corresponding to a speed, distance, and/or direction of travel of a corresponding wheel; and/or the like. The IMU 34B can include any combination of one or more types of sensing devices, such as an accelerometer, gyroscope, magnetometer, and/or the like.

Figure 3A:
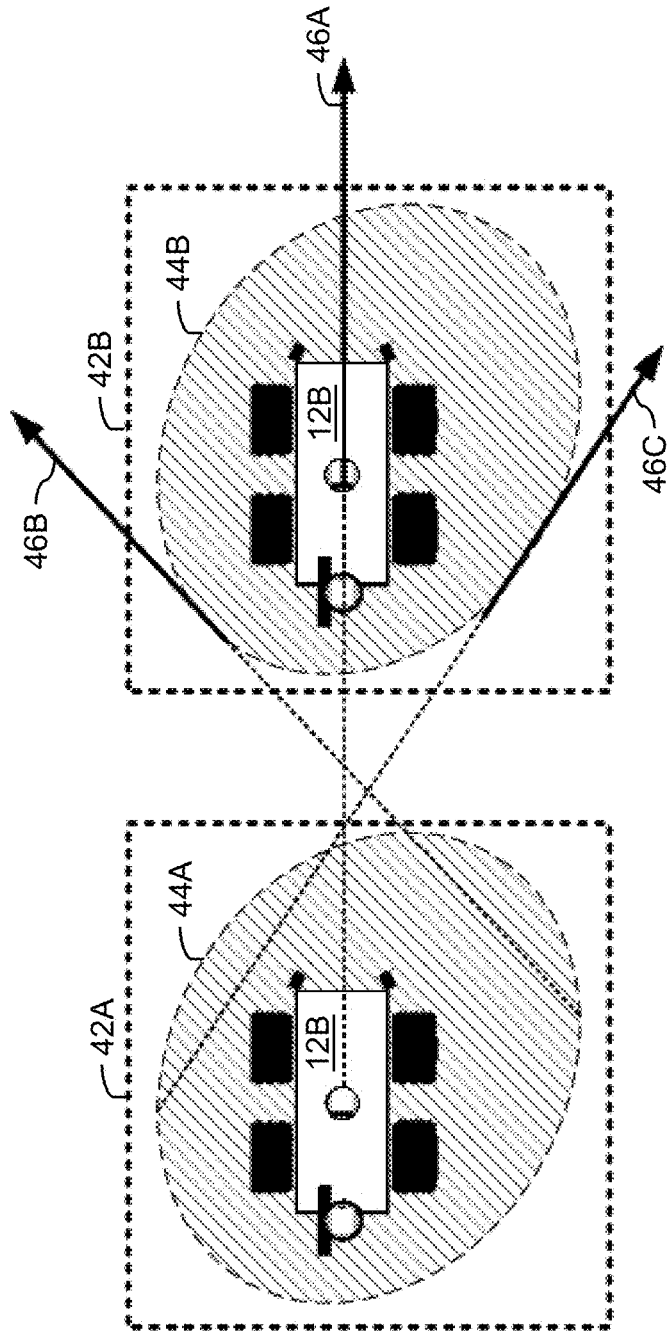
FIGS. 3A-3C show examples of errors in calculating pose-related information using data acquired from an illustrative group of sensing devices according to an embodiment.
Figure 3B:
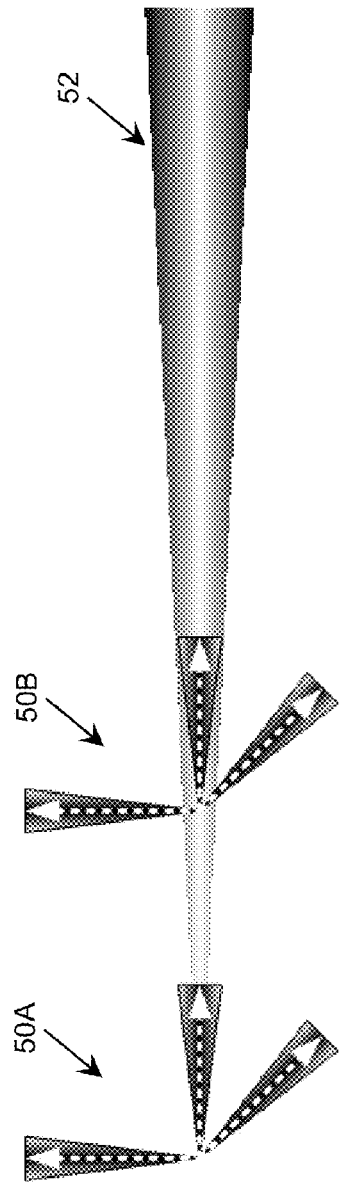
Figure 3C:
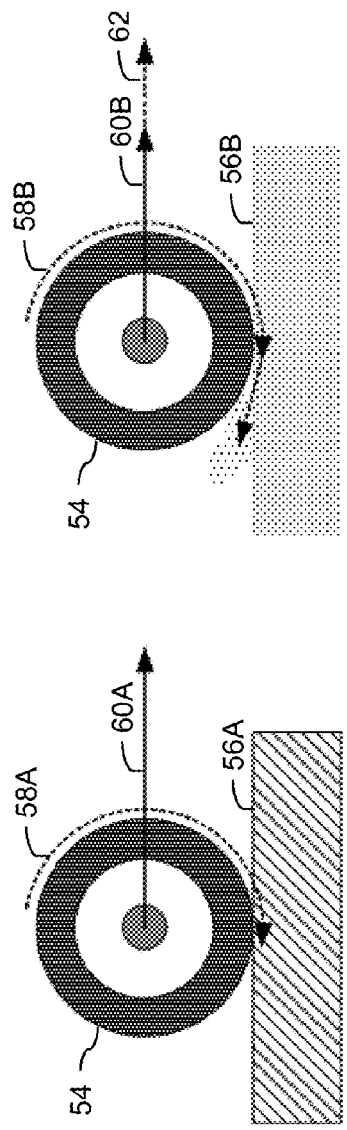

Each of the illustrative sensing devices 34A-34C includes an inherent level of uncertainty or error. To this extent, FIGS. 3A-3C show examples of errors in calculating pose-related information using data acquired from an illustrative group of sensing devices according to an embodiment. In FIG. 3A, various uncertainties with respect to the use of GPS data to track pose of a vehicle 12B is illustrated. The vehicle 12B is shown located in two positions 42A, 42B as indicated by two successive readings of the GPS data for the vehicle 12B. The GPS data for each position 42A, 42B has a known uncertainty 44A, 44B, which corresponds to the actual location within which the vehicle 12B can be located for each position 42A, 42B. While the uncertainties 44A, 44B are each illustrated as having an elliptical shape, it is understood that the precise geometry of each uncertainty 44A, 44B can vary depending, for example, on the latitude and longitude of the vehicle 12B (and therefore the corresponding GPS device located on the vehicle 12B).

Since the GPS data does not inherently provide a heading or "facing" information for the vehicle 12B, the computer system 20 (FIG. 1) can derive the heading information from two or more successive positions 42A, 42B obtained by the GPS device. Using the actual GPS data, a header vector 46A can be calculated for the vehicle 12B. However, when accounting for the extreme actual locations of the vehicle 12B for each position 42A, 42B, header vectors 46B, 46C are possible. As a result, the actual heading vector can be any vector lying between the extreme actual locations corresponding to each position 42A, 42B.

To this extent, a level of uncertainty in the calculated header vector 46A depends strongly on the sizes of the uncertainties 44A, 44B, a distance moved between the positions 42A, 42B, and a confidence that the vehicle 12B moved in a straight line between the positions 42A, 42B. In an embodiment, the GPS data acquired by the GPS device on the vehicle 12B includes real-time data corresponding to the confidence level of each of the reported GPS positions 42A, 42B. In this case, the computer system 20 (FIG. 1) can evaluate a reliability of the calculated header vector 46A based on the error radiuses corresponding to the uncertainties 44A, 44B. In general, the error radius can range from as small as ten centimeters to as large as several tens of meters or more.

FIG. 3B shows error characteristics corresponding to use of multi-axis acceleration data to calculate pose-related information for a vehicle according to an embodiment. The multi-axis acceleration data can be acquired by a multi-axis accelerometer when the accelerometer (and the corresponding vehicle) is located in two different positions 50A, 50B according to an embodiment. The multi-axis data acquired at each position 50A, 50B is illustrated as including data corresponding to a set of three vectors (e.g., the X, Y, and Z directions). Each vector is shown as an arrow surrounded by a maximum uncertainty range, which is based on the physical characteristics of the device and therefore fixed for a particular accelerometer. For example, an illustrative uncertainty range can be 0.5%, which means that for a given acceleration vector (e.g., 3 g), the actual acceleration can be any value between 0.5% below and 0.5% above the acceleration vector (e.g., between approximately 2.985 g and approximately 3.015 g). Since the same uncertainty range is present in each reading, an uncertainty for an overall course 52 calculated by the computer system 20 (FIG. 1) using the accelerometer data grows linearly with time. In an embodiment, the computer system 20 can re-zero the accelerometer when the corresponding vehicle is not moving since the computer system 20 can assume that all accelerations are zero (e.g., except for the constant pull of gravity).

FIG. 3C shows error characteristics relating to use of wheel odometry measurement data to calculate pose-related information according to an embodiment. A wheel 54 can travel in a straight line along a first type of surface 56A (e.g., dry pavement) without slipping. In this case, the powered rotation 58A of the wheel 54 is directly translated at an intersection of the wheel 54 with the surface 56A to forward motion 60A. As a result, the forward motion 60A will be substantially equivalent to a circumference of the wheel 54 for each revolution. However, for another type of surface 56B (e.g., sand), the powered rotation 58B of the wheel 54 is partially expended in skid—rotation without an equivalent forward motion 60B. In this case, the actual forward motion 60B will be less than the corresponding rotation 58B of the wheel 54 by an error amount 62.

Additionally, over a period of operation, the wheel 54 will wear, which results in a portion of the outer layer of the wheel 54 being removed, thereby making the actual circumference of the wheel 54 smaller. As wheel odometry is based on accurate knowledge of the circumference of the wheel 54, the smaller actual circumference will result in the computer system 20 overestimating the distance traveled by the corresponding vehicle. Another source of error for wheel odometry measurement data includes the use of skid steering, which differentially power the wheels to drag, or skid, the vehicle in a particular direction. In this case, during a skid, the forward motion of the skidding wheel produces little or no forward movement and the exact degree of skid for all wheels of the vehicle can be very difficult to determine. Still further, uneven terrain can cause the vehicle to jump forward slightly or slide backwards on an incline, be shunted sideways by an obstacle, and/or the like. Any such movement would not be tracked directly by the rolling wheels, which will lead to uncertainty in the odometry measurement data.

Similar to the illustrative measurement data shown and described in conjunction with FIGS. 3A-3C, use of various other possible types of measurement data to calculate pose-related information will have some level of uncertainty or error due to limitations in the measurement data. To this extent, while no single source of measurement data can be used to fully determine the pose of a vehicle having a good and reliable accuracy, various types of measurement data provide independent approaches to measure various aspects of the pose of the vehicle. Since these approaches are independent, an appropriate combination of these independent approaches should be able to produce a good, robust solution for estimating the pose of a vehicle.

Returning to FIG. 1, in an embodiment, the computer system 20 estimates the pose of the vehicle 12 by fusing measurement data acquired from a plurality of types of sensing devices 34. The computer system 20 can fuse the measurement data using any solution. In an embodiment, the computer system 20 uses a modified extended Kalman filter (EKF) solution to fuse the measurement data.

Initially, the computer system 20 can determine a physical model corresponding to a system comprising the vehicle 12 and the various sensing devices 34, which can be stored as navigation data 40. The physical model can relate various system variables, such as position and orientation of the vehicle 12, to various control inputs and the process noise of the vehicle 12. In an illustrative embodiment, the vehicle 12 is a surface-based vehicle (e.g., ground and/or water). As a result, a height of the vehicle above or a distance of the vehicle below the surface is not considered and the position and orientation of the vehicle 12 can be expressed in terms of a two-dimensional location (x, y), a single yaw angle ($\Theta$), and their associated velocities. However, it is understood that the discussion herein can readily be extended to an aerial vehicle, a submersible vehicle, and/or the like.

In any event, for the surface-based vehicle 12, the state vector of the overall system can be expressed as:

$$\vec{x}_k = f(\vec{x}_{k-1}, \vec{u}_{k-1}, \vec{w}_{k-1}) = \begin{bmatrix} x_k \\ y_k \\ \Theta_k \\ \dot{x}_k \\ \dot{y}_k \\ \dot{\Theta}_k \end{bmatrix}$$

where the physical location of the vehicle 12 is denoted by $(x_k, y_k)$, an orientation of the vehicle 12 is denoted by $\theta_k$, and the corresponding velocities for each are denoted as $\dot{x}_k$, $\dot{y}_k$, and $\dot{\Theta}_k$, respectively. The actual position and orientation of the vehicle 12 are functions of the associated velocities and can be expressed as follows:

$$x_k = x_{k-1} + \Delta_t \dot{x}_{k-1}$$

$$y_k = y_{k-1} + \Delta_t \dot{y}_{k-1}$$

$$\theta_k = \theta_{k-1} + \Delta_t \dot{\theta}_{k-1}$$

where $\Delta_t$ is the sampling period.

The computer system 20 can be configured to calculate estimates of the linear and angular velocities of the system using any solution. For a wheeled vehicle, such as the four wheeled, differentially driven vehicle 12A shown in FIG. 2, the computer system 20 can calculate acceptable estimates of the linear and angular velocities using wheel odometry data from one wheel on each side of the vehicle 12A. In particular, the wheels on the same side of such a vehicle 12A are always provided the same drive command, and a Proportional-Integral-Derivative (PID) controller on the motor controller for each wheel will ensure that both of the wheels on a side of the vehicle 12A will rotate at the same revolutions per minute (RPM). As a result, a linear velocity of the vehicle 12A, D, can be expressed as:

$$D = \frac{r(\dot{\varphi}_L + \dot{\varphi}_R)}{2}$$

and an angular velocity can be expressed as:

$$\dot{\theta} = \frac{r(\dot{\varphi}_R + \dot{\varphi}_L)}{2l}$$

where r is the wheel diameter, l is equal to one half the axle length, and $\dot{\phi}_L$ and $\dot{\phi}_R$ are the angular velocities of the left and right wheels, respectively.

The (x, y) components of the linear velocity of the system can be derived as:

$$\dot{x}_k = D_{k-1} \cdot \cos\Theta_{k-1}$$

$$\dot{y}_k = D_{k-1} \cdot \sin\Theta_{k-1}$$

The angular velocities of the wheels, $\dot{\phi}_R$ and $\dot{\phi}_L$, are control inputs of the system:

$$\vec{u}_k = \begin{bmatrix} \dot{\phi}_L \\ \dot{\phi}_R \end{bmatrix}$$

After accounting for process noise, a final physical model of the system can be expressed as:

$$x_k = x_{k-1} + \Delta_t \cdot \dot{x}_{k-1}$$

$$y_k = y_{k-1} + \Delta_t \cdot \dot{y}_{k-1}$$

$$\theta_k = \theta_{k-1} + \Delta_t \cdot \dot{\theta}_{k-1}$$

$$\dot{x}_k = \frac{r(\dot{\phi}_{L_{k-1}} + \dot{\phi}_{R_{k-1}})}{2} \cdot \cos\Theta_{k-1} + w_1$$

$$\dot{y}_k = \frac{r(\dot{\phi}_{L_{k-1}} + \dot{\phi}_{R_{k-1}})}{2} \cdot \sin\Theta_{k-1} + w_2$$

$$\dot{\theta}_k = \frac{r(\dot{\phi}_{R_{k-1}} - \dot{\phi}_{L_{k-1}})}{2l} + w_3$$

To derive a measurement model for the system, three illustrative sources of measurement for the pose estimation can be used: GPS, IMU, and wheel odometry. The GPS location data provides a measurement of position (x, y) in the world coordinate frame; the IMU data provides a measurement of angular velocity and orientation; and the wheel odometry data provides measurements of position and linear velocity. As discussed herein, the three types of measurement data are subject to noise. As a result, a measurement vector, $\vec{z}_k$, can be related to the system by:

$$\vec{z}_k = \begin{bmatrix} x_{kGPS} \\ y_{kGPS} \\ \dot{\theta}_k \\ x_{kWO} \\ y_{kWO} \\ \sqrt{\dot{x}_k^2 + \dot{y}_k^2} \\ \theta_k \end{bmatrix} + \vec{v}_k$$

where the order of the elements in the measurement vector correspond to: GPS longitudinal position; GPS latitudinal position; IMU angular velocity; wheel odometry longitudinal position; wheel odometry latitudinal position; wheel odometry forward velocity; and IMU orientation. Each of the elements is processed by the filter to generate an estimate. The noise vector, $\vec{v}_k$, represents the noise of the measurements, the values of which are generally unknown. In an embodiment, the filter estimates the values for the noise vector using a solution described herein.

The Jacobian matrixes for use with the filter (e.g., EKF) can be derived from the system of equations described above as follows:

$$A_k = \begin{bmatrix} 1 & 0 & 0 & \Delta_t & 0 & 0 \\ 0 & 1 & 0 & 0 & \Delta_t & 0 \\ 0 & 0 & 1 & 0 & 0 & \Delta_t \\ 0 & 0 & -D_{k-1} \cdot \sin\Theta_{k-1} & 0 & 0 & 0 \\ 0 & 0 & D_{k-1} \cdot \cos\theta_{k-1} & 0 & 0 & 0 \\ 0 & 0 & 0 & 0 & 0 & 0 \end{bmatrix}$$

$$W_k = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}$$

$$H_k = \begin{bmatrix} 1 & 0 & 0 & 0 & 0 & 0 \\ 0 & 1 & 0 & 0 & 0 & 0 \\ 0 & 0 & 0 & 0 & 0 & 1 \\ 1 & 0 & 0 & 0 & 0 & 0 \\ 0 & 1 & 0 & 0 & 0 & 0 \\ 0 & 0 & 0 & \dot{x}_k(\dot{x}_k^2 + \dot{y}_k^2)^{1/2} & \dot{y}_k(\dot{x}_k^2 + \dot{y}_k^2)^{-1/2} & 0 \\ 0 & 0 & 0 & 0 & 0 & 1 \end{bmatrix}$$

$$V_k = I_7$$

where $A_k$ is found by taking the partial derivatives of the physical model equations with respect to each system state variable; $W_k$ is found by taking the partial derivatives of the physical model equations with respect to each system noise vector element (e.g., $w_1$, $w_2$, and $w_3$); $H_k$ is found by taking the partial derivatives of the measurement model equations with respect to each system state variable; $V_k$ is found by taking the partial derivatives of the measurement model equations with respect to each measurement noise vector element; and $I_7$ represents a seven element identity matrix.

The computer system 20 (FIG. 1) can assign a set of initial conditions of the filter, which can be stored as navigation data 40 (FIG. 1). The computer system 20 can initialize the filter when the vehicle 12A is stationary, and therefore, each of the velocities can be assumed to be zero. If the current GPS location data is high quality (e.g., within approximately fifty centimeters or less, which can be obtained with a reasonably unobstructed sky), the computer system 20 can use the GPS location data for the initial (x, y) position of the vehicle 12A. Otherwise, the computer system 20 can determine the initial position of the vehicle 12A using other location data that may be available for the vehicle 12A (e.g., a priori knowledge, such as starting from a known waypoint, data from visual sensing device(s), provided to the vehicle 12A by a user 14 (FIG. 1), and/or the like). Additionally, the computer system 20 can operate using a relative coordinate framework, with the initial position being arbitrarily assigned as a (0, 0) position. When using the relative coordinate framework, the computer system 20 can change to an absolute location once high quality GPS location data is available for the vehicle 12A.

The computer system 20 can initialize an orientation of the vehicle 12A using any solution. For example, the computer system 20 can obtain data from a precision digital compass/magnetometer located on the vehicle 12A to determine the initial orientation/heading. However, calibration of the digital compass/magnetometer over a full three-dimensional range of motion, which can be required to obtain reliable data, can be difficult to perform when it is installed on the vehicle 12A.

In an embodiment, the computer system 20 can initialize the vehicle 12A orientation using GPS location data, when high quality GPS location data is available. For example, the computer system 20 can record a current location of the vehicle 12A using the GPS location data. Subsequently, the computer system 20 can move the vehicle 12A forward a known distance (e.g., a few meters) and record a new location of the vehicle 12A. Using the two locations, the computer system 20 can calculate a heading of the vehicle 12A. Using this approach and with high quality GPS location data, the computer system 20 can calculate an orientation of the vehicle 12A with an accuracy within one degree.

The computer system 20 can use any other solution for initializing the vehicle 12A orientation. For example, if the vehicle 12A is always deployed from the same location (e.g., a garage in which the vehicle 12A is stored), the navigation data 40 can include a default orientation for the vehicle 12A. In this case, the computer system 20 can subsequently determine the bearings and orientation of the vehicle 12A by one or more other navigational approaches, such as successive GPS location readings.

The computer system 20 also can estimate initial covariances for the measurement data acquired from the various sensing devices 34 (FIG. 1). For GPS location data, the computer system 20 can use covariance data, which is provided with the GPS location data. The computer system 20 can use a covariance provided for a sensing device 34, such as a covariance of an IMU's angular velocity measurement, which can be assumed to be constant since the covariance is a physical property of the sensing device. Additionally, the computer system 20 can use an initial covariance of a wheel odometer positional estimate, which is equal to the covariance of the GPS location data since the wheel odometer positional estimate cannot be more accurate than that of the GPS location data.

During operation of the vehicle 12A, the computer system 20 can periodically update the covariances of one or more of the sensing devices 34. The covariances can be used by the computer system 20 to apply an appropriate filter weight to the measurement data for each sensing device 34. By generating an accurate covariance matrix, the computer system 20 can tune the filter by adjusting an amount the measurement data from each sensing device 34 contributes to calculating the pose estimate. For example, the computer system 20 can increase the covariance of the wheel odometry, which can be initially very small (e.g., zero or approximately $1 \times 10^{-9}$) when the vehicle 12A is stationary, over time as the vehicle 12A moves to account for the accumulated error and corresponding uncertainty in the measurement data. In an embodiment, the computer system 20 uses a fixed rate of growth for the wheel odometry error based on, for example, trial and error. For example, for highly accurate wheel odometry a rate of growth for the wheel odometry error can be approximately 0.000001, while unreliable wheel odometry can have a rate of growth for the wheel odometry error of approximately 1.0 or larger.

The computer system 20 also can dynamically update the GPS location data. For example, when a new covariance value for the GPS location data is provided by the GPS device 34A, the computer system 20 can use the new covariance value. However, when the vehicle 12A is operating in a location in which the GPS device 34A does not receive any updated readings from a GPS satellite 16A for a period of time (e.g., indoors, under a bridge, in a tunnel, etc.), the computer system 20 can increase the covariance of the GPS location data continually until a new GPS location fix is received from the GPS satellite 16A.

The computer system 20 also can store a process noise covariance parameter, also called the Q matrix, as navigation data 40. The computer system 20 can use the Q matrix to determine how much weight is placed on the filter's current estimate of the pose, thereby tuning the filter. Since the actual process noise is not known, the computer system 20 can estimate the matrix using any solution. In an embodiment, the computer system 20 sets the Q matrix to a diagonal matrix with the diagonal elements set equal to one of a plurality of possible Q gain values depending on one or more operating attributes of the vehicle 12A. For example, the computer system 20 can use a first set of diagonal elements for when the vehicle 12A is stationary and a second set of diagonal elements for when the vehicle 12A is moving. The first set of diagonal elements can assume that the process noise is negligible. To this extent, the noise of the pose estimates should not cause the resulting estimate calculated by the computer system 20 to register movement of the vehicle 12A while the vehicle 12A is not actually moving. Furthermore, while the vehicle 12A is moving, the filter needs to be responsive to the new measurement data, whereas merely setting the Q gains to a low value would cause the filter to effectively discard the new measurement data. It is understood that the computer system 20 can use a Q matrix of any complexity, e.g., based on any combination of various operating conditions.

In an embodiment, the computer system 20 varies the Q matrix based on a velocity of the vehicle 12A. For example, the elements of the Q matrix can be set to very small values when the vehicle 12A is stationary and larger values, which increase directly with the velocity of the vehicle 12A. The larger values for the process noise, which is not capable of direct measurement, will be considerably higher while the vehicle 12A is moving due to an additional contribution of variable surface friction. As a result, the measurement noise will not cause the estimate to move while the vehicle 12A is stationary, yet the estimate remains responsive to the measurement data while the vehicle 12A is moving (e.g., the latency between actual movement and an update of the estimate is low).

The computer system 20 can account for known inaccuracies in the measurement data. For example, a "course over ground" bearing provided by GPS location data can be highly inaccurate. To this extent, the computer system 20 can calculate a heading from the GPS location data using successive post-filtering positions. The covariance for the GPS-based heading can be reported to the filter as extremely large when the vehicle 12A is stationary to avoid having the elliptical noise characteristic in the GPS location data cause a rapid change in the estimated heading for the vehicle 12A.

The computer system 20 can initially set the covariance of the positional estimate based on wheel odometry to a very small value, and subsequently increase the value while the vehicle 12A is in motion. In general, a certainty of a position estimate calculated using wheel odometry data decreases linearly with the distance that the vehicle 12A has covered. However, when the vehicle 12A is stationary, the certainty remains constant. As a result, the computer system 20 can initially place a large amount of trust in the wheel odometry-based estimate, but trust the estimate less as the vehicle 12A moves farther from the starting point.

When the vehicle 12A is stationary, the computer system 20 can reinitialize the estimate and covariance matrixes used by the filter. Furthermore, the computer system 20 also can re-initialize one or more of the sensing devices 34, if necessary. For example, when the vehicle 12A includes an IMU with internal gyroscopes, the gyroscopes can be zeroed. The re-initialization can eliminate any accumulated error so the computer system 20 can reset the corresponding terms in the measurement covariance matrix to very small values.

FIG. 4 shows an illustrative process for managing movement of a vehicle, which can be implemented by the computer system 20 (FIG. 1), according to an embodiment. Referring to FIGS. 1 and 4, in action 102, the vehicle 12 is initially at rest. As a result, the computer system 20 uses a process noise matrix (Q matrix) corresponding to when the vehicle 12 is stationary. As the vehicle 12 is at rest, the various sensing devices 34 can be initialized.

To this extent, in action 104, the computer system 20 obtains GPS location data from a GPS sensing device 34. When the GPS location data is high quality GPS location data, the computer system 20 can set the location of the vehicle 12 based on the GPS location data. In action 106, the computer system 20 can initialize a set of wheel odometry sensing devices 34. For example, the computer system 20 can set the covariance of the wheel odometry data to a very small value. Furthermore, the computer system 20 can set the physical location corresponding to the wheel odometry data equal to the GPS location data. In action 108, the computer system 20 can initialize a three-axis accelerometer sensing device 34. For example, the computer system 20 can re-zero the acceleration values for each axis of the accelerometer to zero. Additionally, the computer system 20 can set a covariance value for an accelerometer-based vehicle location to a very small value.

After the vehicle 12 starts moving, the computer system 20 can calculate and update the pose estimation for the vehicle 12. To this extent, in action 110, the vehicle 12 can move a short distance (e.g., forward, in response to a command provided by the computer system 20, a user 14, and/or the like) between successive estimations. The distance traveled is dependent on a velocity of the vehicle 12 and a rate of estimations being calculated by the computer system 20. For example, for a vehicle 12 traveling at approximately one meter per second and a computer system 20 generating ten estimations per second, the distance between successive estimations will be approximately 0.1 meters. During the vehicle 12 movement, each of the sensing devices 34 can obtain updated pose-related data, which is obtained by the computer system 20 for processing. The processing can include, for example, using an EKF to generate one or more pose-related estimates using the sensor data. The computer system 20 can store the pose-related sensor data obtained from the sensing devices 34 and/or pose data derived from the sensor data as navigation data 40.

For example, in action 112, the computer system 20 can obtain wheel odometry data corresponding to the movement of one or more wheels of the vehicle 12, and in action 114, the computer system 20 can calculate movement, facing, and/or the like, for the vehicle 12 using the wheel odometry data. In action 116, the computer system 20 can obtain GPS location data for the vehicle 12, and in action 118, the computer system 20 can record the GPS location data and calculate a heading for the vehicle 12 using the most recent GPS location data and one or more previous recordings of the GPS location data for the vehicle 12. In action 120, the computer system 20 can obtain accelerometer data, and in action 122, the computer system 20 can determine a change in the facing of the vehicle 12 and movement for the vehicle 12 using the accelerometer data. It is understood that while these types of sensor data and calculations are shown and described for purposes of illustration, any combination of various types of sensor data and/or calculations can be implemented.

In action 124, the computer system 20 can use the sensor data and/or the various pose-related estimates to adjust the covariance matrix for a corresponding type of sensor data. For example, the computer system 20 can adjust a covariance value to account for an accumulated error in the sensor data, an age of the sensor data, an actual accuracy of the sensor data, and/or the like. In action 126, the computer system 20 can apply the corrections to the pose-related estimations and calculate a pose estimation for the vehicle 12 based on a combination of the pose-related estimates from the various types of sensor data.

In action 128, the computer system 20 can determine whether the vehicle 12 is in motion (e.g., using one or more of the wheel odometry data, acceleration data, GPS location data, and/or the like). If not, in action 130, the computer system 20 can continue or switch to using the static process noise matrix and return to actions 106, 108, where one or more of the sensing devices 34 can be re-initialized. If the vehicle 20 is still moving, in action 132, the computer system 20 can continue or switch to using the moving process noise matrix and return to action 110.

It is understood that the discussion of various aspects of the invention included herein is only for purposes of illustration and various alterations to the embodiments described herein are possible. For example, an embodiment can utilize another type of sensing device 34 to provide pose-related data, which is processed by the computer system 20 in order to calculate the pose estimate. In this case, the matrices described herein can be adjusted (e.g., expanded) to characterize the data obtained from the different sensing device(s) 34 appropriately. Different types of sensing devices 34 can provide additional and/or alternative pose-related data. For example, the vehicle 12 can include a set of smart video sensing devices 34, which can provide video data including one or more landmarks, which can be identified and used to determine a current location and/or bearing of the vehicle 12. In this case, the computer system 20 can use an uncertainty for such calculations, which is based on a resolution of the image data, dimensions of the landmark(s), certainty of the target identification, and/or the like. As another example, an optical flow sensing device 34 can provide information corresponding to a speed, relative turning, and pose of the vehicle 12, which the computer system 20 can process to calculate one or more pose estimates. As a further example, a laser scanner, acoustic sensor, and/or the like, can provide sensor data corresponding to a velocity of the vehicle 12 with respect to a known immobile target, which the computer system 20 can use in calculating the pose of the vehicle 12.

When the vehicle 12 is an aerial vehicle, the computer system 20 can perform the navigation and location estimates in three dimensions to also include an altitude of the vehicle 12. In such an implementation, the GPS location data can generally be more reliable as there will be fewer to no obstructions. However, the vehicle 12 will need to include a different set of relative sensing devices 34 than those described herein. For example, an airspeed sensing device 34 can provide a distance estimate, but the presence of strong winds can introduce error (e.g., compared to a ground vehicle, an aerial vehicle is almost always "skidding"). A pressure sensor/altimeter also can be included to provide a good estimate of a height of the vehicle 12, and can be cross-referenced with other data for height above ground.

When the vehicle 12 is a watercraft (e.g., surface or submerged), the vehicle 12 also can include a modified set of sensing devices 34. For example, a submersible vehicle 12 can lose GPS information upon reaching a certain depth. However, such a vehicle 12 can use data acquired from a water pressure sensing device 34 to estimate a depth of the vehicle 12, sonar data matched with known underwater feature maps to provide an estimate of the vehicle 12 location, and/or the like.

While shown and described herein as a method and system for managing movement of a platform, it is understood that aspects of the invention further provide various alternative embodiments. For example, in one embodiment, the invention provides a computer program fixed in at least one computer-readable medium, which when executed, enables a computer system to manage movement of a platform. To this extent, the computer-readable medium includes program code, such as the navigation program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the navigation program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing movement of a platform. In this case, the generating can include configuring a computer system, such as the computer system 20 (FIG. 1), to implement the method of managing movement of the platform. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
a computer system periodically calculating a plurality of estimates corresponding to a pose of a platform, wherein the periodically calculating includes:
for each of a plurality of types of sensor data, independently calculating at least one of a plurality of preliminary estimates based on the sensor data corresponding to the type of sensor data;
adjusting a covariance matrix including covariance data for each of the plurality of types of sensor data based on an uncertainty for at least one of the plurality of preliminary estimates, wherein the uncertainty varies based on at least one of: time, distance, or velocity of the platform; and
generating the plurality of estimates using the plurality of preliminary estimates and the covariance matrix, wherein the covariance matrix is applied to each of the plurality of estimates to adjust an emphasis each of the plurality of preliminary estimates has on the corresponding estimate.

2. The method of claim 1, wherein the plurality of types of sensor data include: global positioning system measurement data; inertial data; and wheel odometry data.

3. The method of claim 1, wherein the adjusting includes dynamically adjusting at least one entry of the covariance matrix based on at least one of: an amount of time the platform has been moving, a distance the platform has moved without stopping, or an amount of time since external location information has been received.

4. The method of claim 3, wherein the at least one entry corresponds to wheel odometry data for the platform, and wherein the computer system increases the uncertainty corresponding to the wheel odometry data based on an amount of time the platform has been moving.

5. The method of claim 1, wherein the adjusting includes the computer system reinitializing at least one entry of the covariance matrix in response to the platform being stationary.

6. The method of claim 1, wherein the generating includes applying one of a plurality of process noise covariance matrixes to the plurality of preliminary estimates to generate the plurality of estimates, wherein each of the process noise covariance matrixes corresponds to an uncertainty due to at least one attribute of the platform.

7. The method of claim 6, further comprising the computer system selecting a stationary process noise covariance matrix when the platform is stationary and selecting a moving process noise covariance matrix when the platform is moving.

8. The method of claim 7, wherein the adjusting includes the computer system dynamically adjusting at least one entry of the moving process noise covariance matrix based on a velocity of the platform.

9. The method of claim 1, wherein the platform is a vehicle, the method further comprising the computer system managing navigation of the vehicle using the plurality of estimates corresponding to the pose.

10. A computer system comprising:
a set of computing devices configured to perform a method comprising periodically calculating a plurality of estimates corresponding to a pose of a platform, wherein the periodically calculating includes:
for each of a plurality of types of sensor data, independently calculating at least one of a plurality of preliminary estimates based on the sensor data corresponding to the type of sensor data;
adjusting a covariance matrix including covariance data for each of the plurality of types of sensor data based on an uncertainty for at least one of the plurality of preliminary estimates, wherein the uncertainty varies based on at least one of: time, distance, or velocity of the platform; and
generating the plurality of estimates using the plurality of preliminary estimates and the covariance matrix, wherein the covariance matrix is applied to each of the plurality of estimates to adjust an emphasis each of the plurality of preliminary estimates has on the corresponding estimate.

11. The computer system of claim 10, wherein the plurality of types of sensor data include: global positioning system measurement data; inertial data; and wheel odometry data.

12. The computer system of claim 10, wherein the adjusting includes dynamically adjusting at least one entry of the covariance matrix based on at least one of: an amount of time the platform has been moving, a distance the platform has moved without stopping, or an amount of time since external location information has been received.

13. The computer system of claim 12, wherein the at least one entry corresponds to wheel odometry data for the platform, and wherein the computer system increases the uncertainty corresponding to the wheel odometry data based on an amount of time the platform has been moving.

14. The computer system of claim 12, wherein the adjusting includes reinitializing at least one entry of the covariance matrix in response to the platform being stationary.

15. The computer system of claim 10, wherein the generating includes applying one of a plurality of process noise covariance matrixes to the plurality of preliminary estimates to generate the plurality of estimates, wherein each of the process noise covariance matrixes corresponds to an uncertainty due to at least one attribute of the platform.

16. The computer system of claim 15, the method further comprising selecting a stationary process noise covariance matrix when the platform is stationary and selecting a moving process noise covariance matrix when the platform is moving.

17. The computer system of claim 10, wherein the platform is a vehicle, the method further comprising managing navigation of the vehicle using the plurality of estimates corresponding to the pose.

18. A vehicle comprising:
a navigation system including a set of computing devices configured to perform a method comprising:
periodically calculating a plurality of estimates corresponding to a pose of the vehicle, wherein the periodically calculating includes:
for each of a plurality of types of sensor data, independently calculating at least one of a plurality of preliminary estimates based on the sensor data corresponding to the type of sensor data;
adjusting a covariance matrix including covariance data for each of the plurality of types of sensor data based on an uncertainty for at least one of the plurality of preliminary estimates, wherein the uncertainty varies based on at least one of: time, distance, or velocity of the platform; and
generating the plurality of estimates using the plurality of preliminary estimates and the covariance matrix, wherein the covariance matrix is applied to each of the plurality of estimates to adjust an emphasis each of the plurality of preliminary estimates has on the corresponding estimate; and
managing navigation of the vehicle using the plurality of estimates corresponding to the pose.

19. The vehicle of claim 18, wherein the adjusting includes dynamically adjusting at least one entry of the covariance matrix based on at least one of: an amount of time the vehicle has been moving, a distance the vehicle has moved without stopping, or an amount of time since external location information has been received.

20. The vehicle of claim 18, the method further comprising selecting a stationary process noise covariance matrix when the vehicle is stationary and selecting a moving process noise covariance matrix when the vehicle is moving.

* * * * *